April 26, 1938.   J. H. HUNT   2,115,071
HYDRAULIC BRAKE
Filed Feb. 16, 1935   6 Sheets-Sheet 1
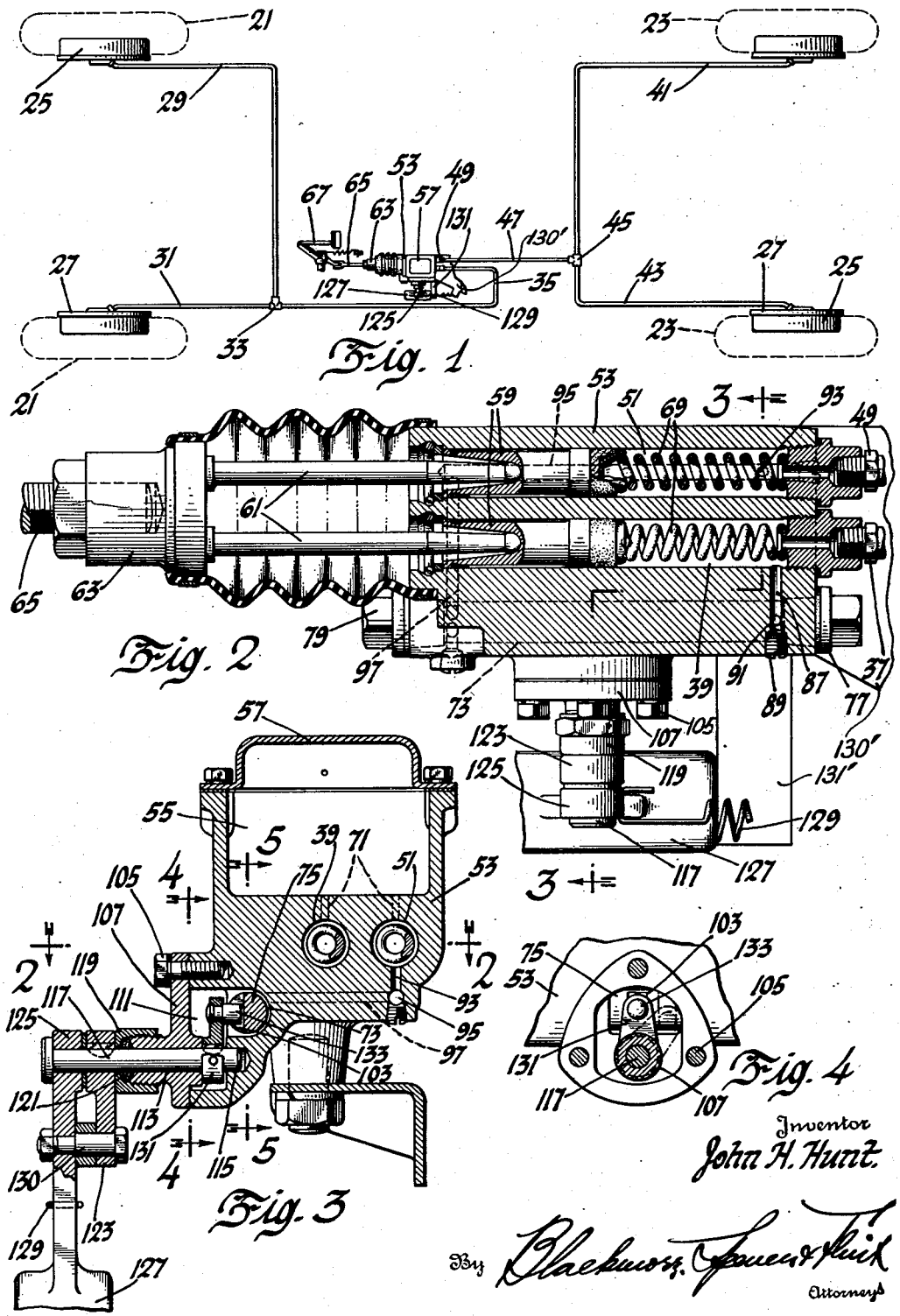
Inventor
John H. Hunt.
By Blackmore, ..... 
Attorneys April 26, 1938.　　J. H. HUNT　　2,115,071
HYDRAULIC BRAKE
Filed Feb. 16, 1935　　6 Sheets-Sheet 2
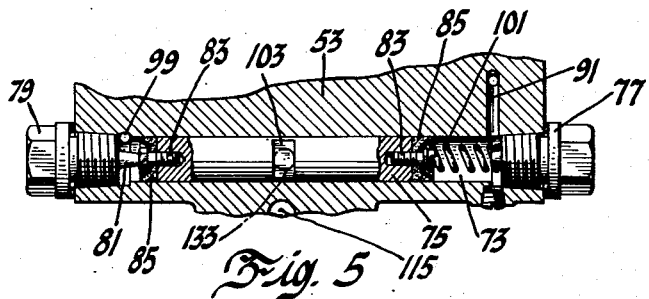
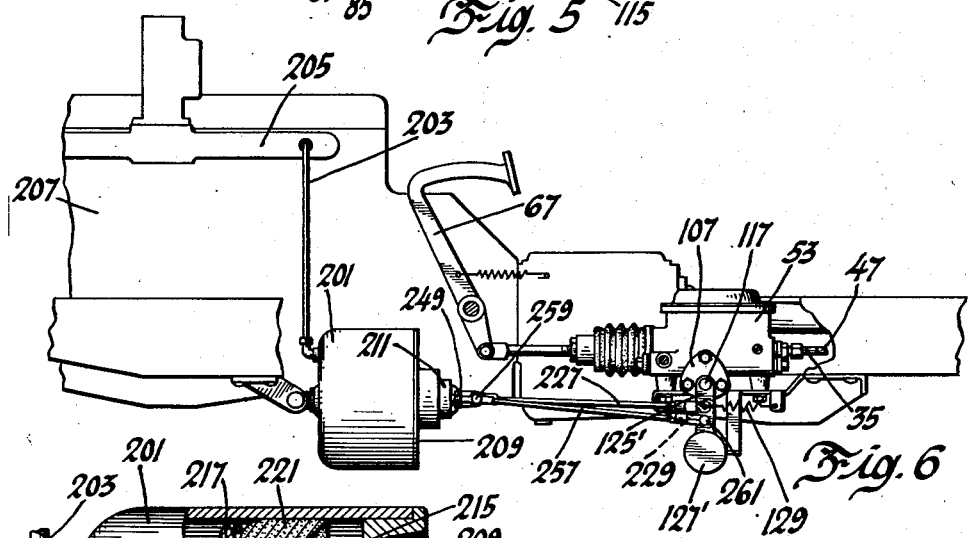
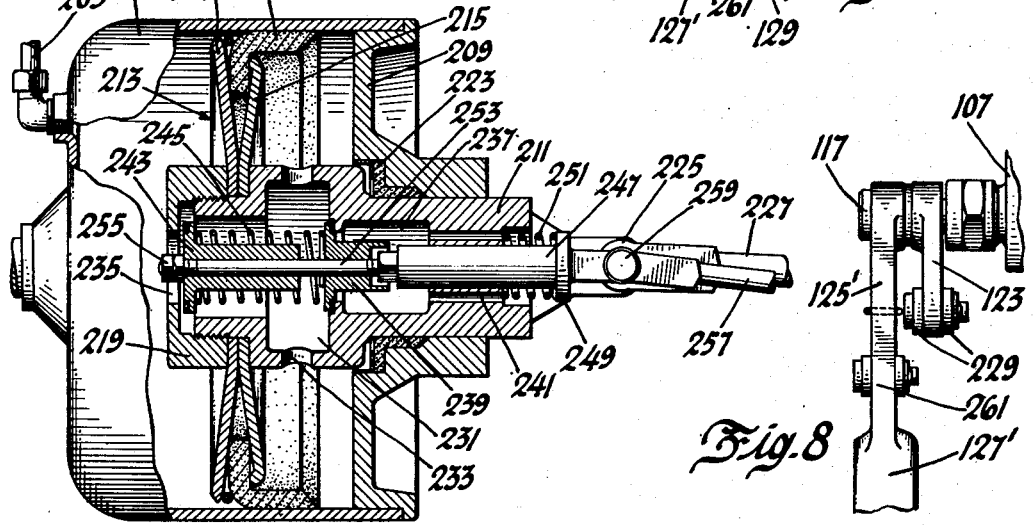
Inventor
John H. Hunt

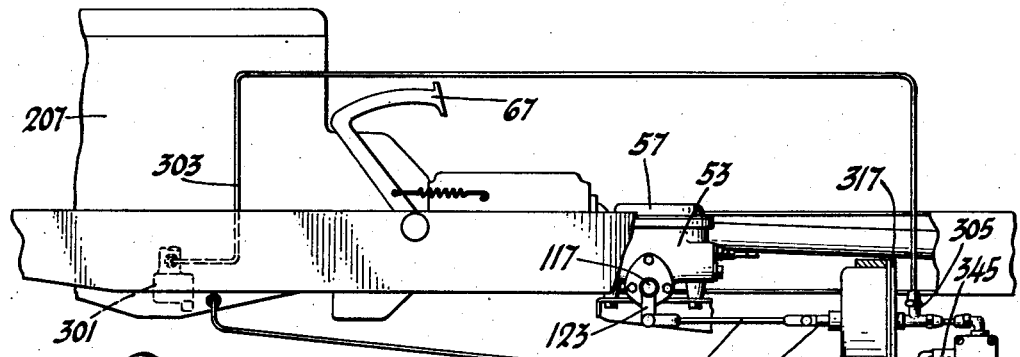
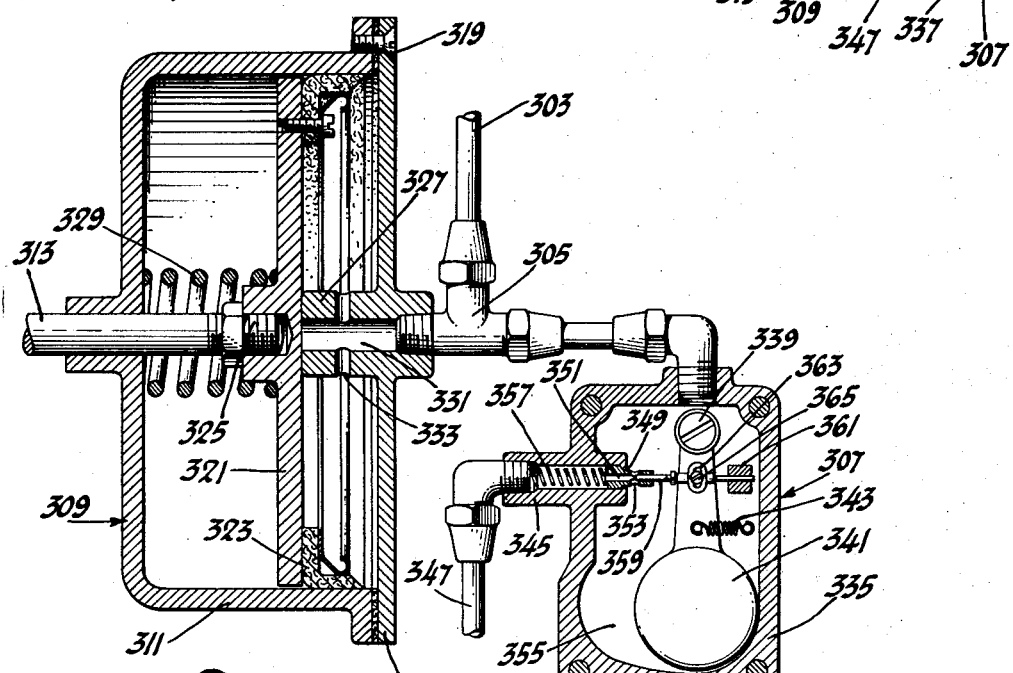

April 26, 1938.  J. H. HUNT  2,115,071
HYDRAULIC BRAKE
Filed Feb. 16, 1935  6 Sheets-Sheet 4
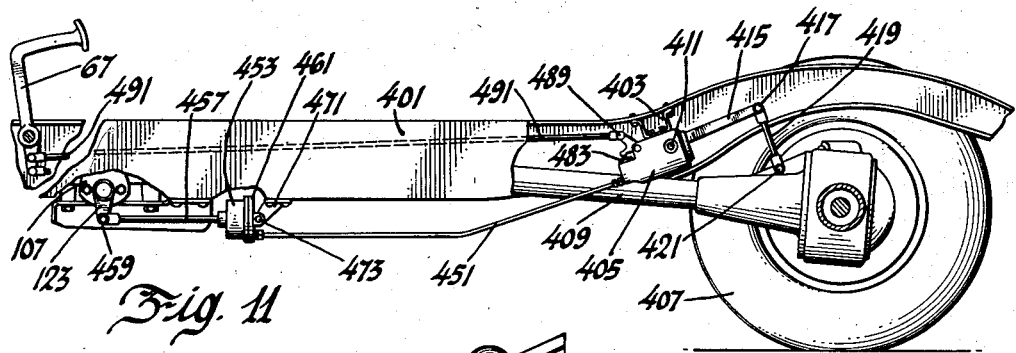
Fig. 11
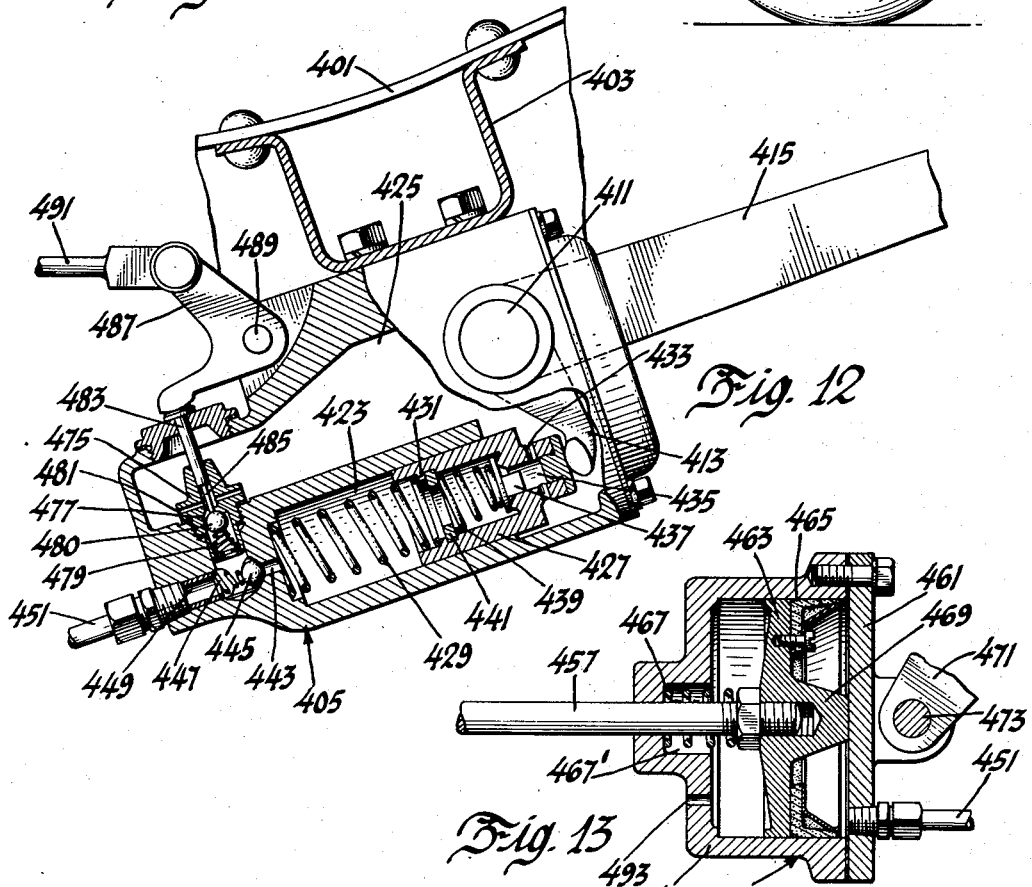
Fig. 12
Fig. 13
Inventor
John H. Hunt
By Blackmore, Spencer & Flint
Attorneys April 26, 1938.  J. H. HUNT  2,115,071
HYDRAULIC BRAKE
Filed Feb. 16, 1935  6 Sheets-Sheet 5
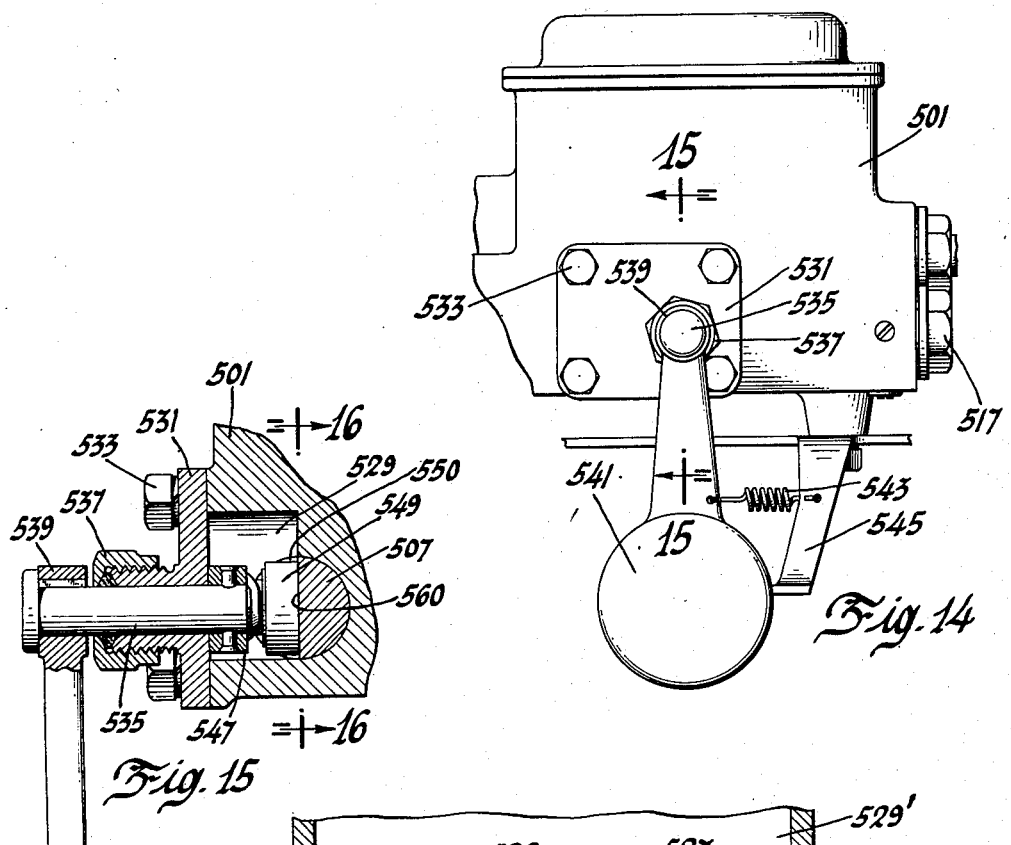
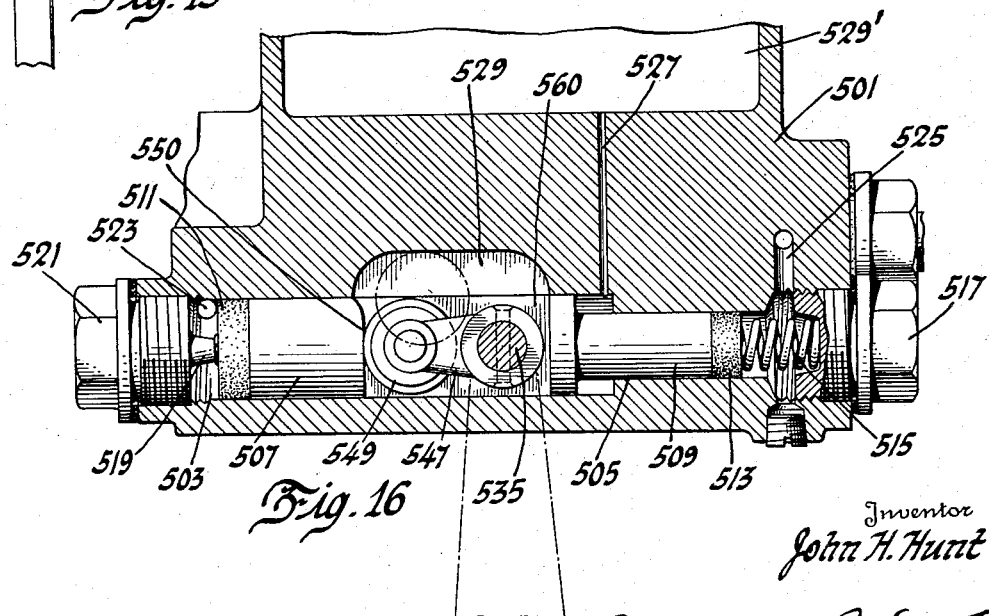

April 26, 1938.  J. H. HUNT  2,115,071
HYDRAULIC BRAKE
Filed Feb. 16, 1935   6 Sheets-Sheet 6

Inventor
John H. Hunt
By Blackmore, Ewer & Fink
Attorneys

Patented Apr. 26, 1938

2,115,071

UNITED STATES PATENT OFFICE 2,115,071

HYDRAULIC BRAKE

John H. Hunt, Detroit, Mich., assignor to General Motors Corporation, Detroit, Mich., a corporation of Delaware Application February 16, 1935, Serial No. 6,768

17 Claims. (Cl. 188—152)

This invention relates to brakes and has been designed as an improvement for use with four wheel hydraulic brakes as used on motor vehicles.

It is known to be desirable that the ratio of braking between the front and rear wheels, taken collectively, shall approximate the ratio of weight supported by the front and rear wheels. It is also known that the weight distribution changes as a vehicle travels on a grade and also that it changes due to inertia incident to deceleration. Even if the weight of a vehicle be divided equally between the front and rear supporting wheels as it stands at rest or as it travels at a uniform rate on a level road it will be obvious that some of the weight is shifted from the rear wheels to the front wheels when the vehicle travels down hill or is being decelerated.

An object of this invention is to change the ratio of front and rear hydraulic braking forces to correspond with the change in weight distribution.

A further object is to provide means responsive to the change in weight distribution and to deceleration to automatically redistribute the fluid pressure braking forces.

As a still further object the inventor contemplates the resort to servo means through the instrumentality of which the above described automatic redistribution of braking forces may function.

As a still further object in certain forms of the invention unbalanced hydraulic pressures may be used to effect the shift of braking forces.

Other objects and advantages will appear from the following description.

In the accompanying drawings, Fig. 1 is a schematic plan view of a four wheel hydraulic braking system equipped with my invention.

Fig. 2 is a horizontal section through the double master cylinder unit used with the assembly shown in Fig. 1, the view being taken on line 2—2 of Fig. 3.

Fig. 3 is itself a section on line 3—3 of Fig. 2.

Fig. 4 is a section on line 4—4 of Fig. 3.

Fig. 5 is a section on line 5—5 of Fig. 3.

Fig. 6 is a view in side elevation of a modified form wherein a vacuum servo mechanism is employed as the instrumentality through the aid of which the braking forces are redistributed.

Fig. 7 is a view in elevation and partly in vertical section of the power unit used in the assembly illustrated in Fig. 6.

Fig. 8 is a detail in end elevation of a part of the operating mechanism shown in Fig. 6.

Fig. 9 shows in side elevation another modification, one wherein hydraulic means is employed for the servo mechanism.

Fig. 10 illustrates mainly in vertical section parts of the operating mechanism shown in Fig. 9.

Fig. 11 shows, for the most part in side elevation, still another embodiment, one wherein the mass of the structure supported by the wheels functions more directly to introduce the servo mechanism to redistribute the braking forces.

Fig. 12 is a view in vertical section of one of the elements shown by Fig. 11.

Fig. 13 is a view in vertical section of another of the parts shown in Fig. 11.

Fig. 14 shows in side elevation a modification of the force redistributing device, one wherein in place of the reciprocating piston member of Fig. 5 there is employed a substitute having parts of unequal diameters.

Fig. 15 is a section on line 15—15 of Fig. 14.

Fig. 16 is a longitudinal section on line 16—16 of Fig. 15.

Figure 17:
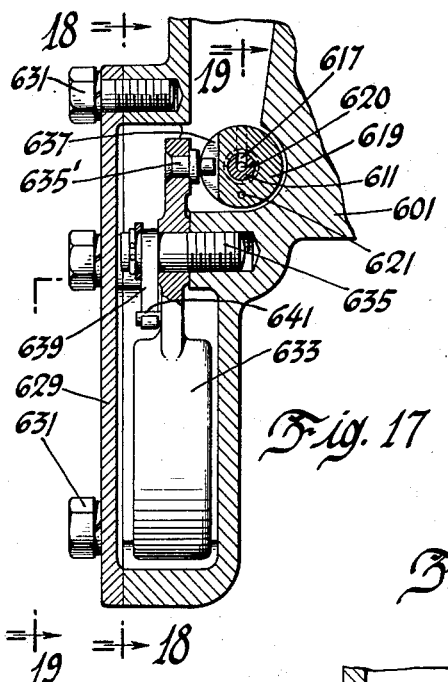
Fig. 17 is a transverse section through still another form of braking force redistributing device.

Figures 1-5 inclusive represent a first form in which the invention is shown. Referring to these figures, 21 is used to designate front supporting wheels of a vehicle and 23 marks the rear wheels. At each wheel is shown a rotatable brake drum 25 closed by a fixed cover 27. As is conventional in hydraulic brake installations there is secured to the cover 27 and within each drum a so-called wheel cylinder operable to expand shoes into drum contact to retard the drum and wheel rotation. No novelty is claimed for the wheel cylinder and no showing of this element is made. Pipes 29 and 31 extending from the front wheel cylinders are united by a T 33 from which a pipe 35 is connected by a fitting 37 to the work end of a front wheel master cylinder 39. Similarly pipes 41 and 43 from the rear wheel cylinders are connected to a T 45, the latter connected by a pipe 47 to a fitting 49 at the end of a rear wheel master cylinder 51. The two master cylinders are constituted by parallel bores in a casting 53. In this casting is a chamber 55 constituting the usual reservoir for the master cylinder. This reservoir is closed by a cover 57. Within the master cylinders are twin pistons 59 operated jointly by rods 61 connected to a cross head 63, the latter connected as by rod 65 to the lower end of the manually operated pivoted lever or pedal 67. The pistons are thrust to their brake release position by springs 69. As is conventional, small passages 71 afford communication between the reservoir and the master cylinders communicating with the latter only in the brake release position of the master pistons.

Also formed in the casting 53 is a bored out cylinder 73 reciprocable within which is a piston 75. This cylinder 73 is closed at one end by a threaded plug 77 and at the other end by a plug 79, the latter having an axial stop 81. Screws 83 secure cup-shaped packings 85 to the two ends of piston 75. From master cylinder 39, the one communicating with the front wheel brake cylinders, there extends through casting 53 a horizontal conduit 87, the passage closed by a plug 89. This horizontal passage or conduit 87 extends to a point vertically above the bore 73 and a vertical passage 91 unites the passage 87 with the end (right end as seen in Fig. 5) of bore 73. The left end of bore 73 communicates with master cylinder 51 by means of a vertical passage 93, a longitudinal passage 95 and a transverse passage 97 opening into the cylinder 73 at 99. Within cylinder 73 between the plug 77 and the piston 75 is a spring 101 normally pressing the piston to the left and into contact with stop 81. The piston 75 has between its ends a notch 103.

To the side wall of casting 53 adjacent the cylinder bore 73 is secured by fastening means 105 a cover 107. This cover encloses a space 111 within the casing communicating with the midportion of the cylinder 73. Journaled in cover opening 113 and in an opening 115 in the casting is a shaft 117. Leakage around the shaft is prevented by a cap 119 and packing 121. Keyed to the shaft is a lever arm 123. Rotatable on the end of the shaft is the stem 125 of a weight or pendulum 127. Fastening means 130 secures together arm 123 and stem 125. A spring 129 suitably anchored at 130' attached to the stem 125 holds the stem of the weight to the right against a stop 131'. Within the cover 107 there is pinned to shaft 117 an arm 131 from which a pin 133 projects into notch 103.

The operation will be readily understood. When the vehicle is at rest or traveling forward at a uniform rate, pressure on pedal 67 pushes both master pistons 59 and forces fluid into the conduits and wheel cylinders acting with equal force upon the brakes both front and rear. When the brakes are applied to the wheels of a moving vehicle the load of the supported body tends, under the influence of inertia, to shift forward and more of the load is then supported by the front wheels than before. If the vehicle is moving the deceleration resulting from the brake application tends to cause the weight to swing under the influence of inertia and rock shaft 117 clockwise (in the illustrative figures). This rocking actually occurs and piston 75 is shifted to the right provided the inertia is sufficient to overcome spring 101 which is so tensioned as to permit the shift to occur upon any appreciable decelerating action. The shift of the piston 75 exerts fluid pressure and supplements the pressure exerted by the piston of front wheel master cylinder 39 because it is the right end of cylinder 73 which is in communication with cylinder 39. Similarly it relieves the pressure to the left of piston 75 and in the rear wheel brake conduits 47, 43, 41 thus reducing the pressure on the rear wheel brakes. In this way as the load is shifted from the rear to the front the braking forces are similarly redistributed. When deceleration ceases it will be clear that the weight is returned to its position of rest by its spring 129 and the parts are restored to their initial positions. The redistribution will occur even more readily if the brake is applied while the vehicle is traveling down hill because the action of gravity is available to supplement the influence of inertia in swinging the weight and shifting the piston 75.

It will be possible to use a smaller weight if the same is not used to directly shift the piston 75 but to introduce a source of power which shall serve to shift the piston 75. To this end the vacuum of the engine is available and in Figs. 6, 7, and 8 there is shown a modification to so operate. In this embodiment the same casting 53 may be used containing the plural master cylinders, redistributing cylinder 73 and connected passages. The same pedal 67 is to be used for operating the master pistons and the same conduit system between the master cylinders and the wheel cylinders. As shown by Fig. 8, it will be seen that the lever arm 123 is not connected to the weight stem 125', the stem in this case carrying a lighter weight 127'. A vacuum power cylinder resembling others used for vacuum application of brakes is marked 201. A pipe 203 connects the closed end of the power cylinder to the manifold 205 of the engine 207, this being suggested merely as a suitable source of subatmospheric pressure. The cylinder has a closure 209 through the center of which is slidable the hub 211 of a piston designated as a whole by numeral 213. This piston includes in addition to the hollow hub 211 certain discs 215, 217 which are clamped to the hub 211 by a threaded cap 219. Peripherally the discs carry a cupped packing 221. Suitable packing between the hub 211 and the closure 209 is seen at 223. The hub 211 has pivoted thereto outside the power cylinder as at 225 a rod 227 which latter has a forked end 229 pivoted to arm 123 as shown in Fig. 8.

The hub 211 has an inner chamber 231 communicating by radial passages 233 with the space at the right side of the cupped packing 221. The cap 219 has an opening 235 affording communication between the chamber 231 and the region within the power cylinder to the left of the packing. Spaced from chamber 231 is a second chamber 237 also within the hub 211. Chamber 237 is of smaller diameter than chamber 231 and may be closed from communication therewith by a valve 239 seating on the wall between these two chambers. The chamber 237 is adapted to communicate with the atmosphere by means of passages 241. Another valve 243 is located coaxially with valve 239. A spring 245 has its ends in engagement with both valves. The two valves may be positioned by a stem 247 slidable centrally through the hub 211. This stem has a flange 249 and a spring 251 engages the hub 211 and the flange 249. The reduced extension 253 of stem 247 carries slidably the valves 239 and 243. A nut 255 on the end of extension 253 normally holds the valve 243 in brake release position. A link 257 is pivoted to the outer end of stem 247 at 259. This link is jointed to the stem 125' at 261. It should be explained that spring 251 is stiffer than spring 245 so that it normally holds valve 243 open whereby spring 245 may hold valve 239 on its seat.

The operation is as follows: Fig. 7 shows the power cylinder when the parts are in brake released position. From that figure it will be seen that engine suction prevails on both sides of piston 213 since valve 243 is being held open by spring 251. Admission of air to the right of the piston 213 is prevented by the valve 239, the latter held by spring 245. If now a predetermined extent of deceleration occurs as the result of brake application, weight 127' swings and pushes link 257 and stem 247 against the resistance of spring 251. Spring 245 is thus permitted to close valve 243 and the suction communication between the two sides of piston 213 is cut off. A slightly additional movement of stem 247 positively engages and pushes valve 239 off its seat permitting air to pass through passages 241, into chamber 237, into chamber 231 and through passages 233 to the right side of the piston 213. The unbalanced pressure moves the piston to the left. Its rod and link connection to the arm 123 functions as before to shift the distributing piston 75. This device is self-closing because the movement of the piston 213 closes valve 239 and cuts off the air inlet. The valve may be again opened by the weight if it continues its swing. The extent of redistribution is therefore proportional to the extent of deceleration.

Figs. 9 and 10 show diagrammatically a hydraulic servo device for similarly shifting the piston of the redistributing unit. A pump 301 which is a servo pump for this mechanism delivers oil through pipe 303 to a T 305. From the T the oil may flow to an inertia controlled valve device 307 or to a power unit 309. The power unit consists of a cup-shaped cylinder 311 through the bottom of which passes a rod 313. A link 315 is pivoted to the piston rod and to the arm 123 extending from shaft 117. The shaft 117 extends into the recess 111 of the casting 53 and its rocking motion similarly operates the reciprocating piston 75 of the redistributing device, all as more fully shown in Figs. 1-5 inclusive. The power unit has a cover 317 tightly fitted and secured thereto as by fastening means 319. The piston 321 with its packing 323 is connected to the rod at 325. It is pressed toward the right and into abutment with a cover boss 327 by a spring 329. The boss has a through aperture 331 for connection with one branch of the T. The boss also has radial apertures 333 affording communication with the right side of the piston. The valve unit 307 comprises a housing 335 shaped as shown and having a cover 337. Pivoted at 339 within the housing is a swinging weight 341 normally held by a spring 343 against the housing wall which thus serves as a stop. On the wall of the housing opposite the stop is a bored out boss 345 to the outer end of which is connected a return pipe 347 leading to the crank case adjacent an oil pump 301. Slidable within the aperture of boss 345 is a valve 349 having an axial passage 351 communicating by radial passages 353 with the internal chamber 355 of the valve unit 307 when pressed to the right by a spring 357 as shown. The valve has connected thereto a rod 359 guided as at 361. In an intermediate position the valve rod 359 has a vertically elongated slot 363 through which passes a screw or stud 365 carried by the weight whereby the swinging of the weight about its center 339 reciprocates the valve. When the weight swings clockwise the valve is reciprocated to the left and the radial passages are closed from communication with chamber 355.

In this embodiment of the invention oil is normally flowing from the pump 301 through the pipe 303 into the valve unit chamber 355, thence through the radial and axial passages of the valve 349 and the return pipe 347 to the crank case. At the T it selects this path because of the resistance offered by the piston of the power unit backed by the spring 329. If, however, the operator applies the hydraulic brakes by depressing pedal 67 a given decelerating effect causes weight 341 to swing clockwise and cut off the return flow of oil through the valve 349 and pipe 347. In that case the oil enters power unit 309 and pushes the piston 321 against its spring 329. The piston rod operates through link 315 to swing arm 123 and reciprocate the piston 75 of the redistributing unit as in the forms of invention previously described.

Figs. 11, 12, and 13 disclose an embodiment of the invention wherein the chassis and body serve the purpose of the swinging weight. In this form of the invention there may be used the same casting 53 with the master cylinders, redistributing cylinder and connecting passages, and the same rock shaft 117 with its inner arm 131 and outer arm 123. The chassis frame 401 carries by means of a bracket 403 a control unit 405 located in the vicinity of the rear axle 407. At 409 is shown the propeller shaft for driving the rear wheels. Within the pump unit 405 is a rock shaft 411 carrying an internally disposed arm 413 and an external arm 415. To the latter is pivoted at 417 a link 419 the other end of which is pivoted at 421 to some part of the rear axle housing. It will be understood that when brakes are applied to the wheels 407 and their rotation is checked, the inertia of the chassis frame causes the link 419 and arm 415 to tend to straighten out toward alignment with a resulting clockwise rocking of shaft 411 with its internal arm 413. Within the control unit is an internal cylinder 423 much like the master cylinder of a conventional hydraulic brake system. The chamber 425 within the unit 405 and outside the cylinder 423 is analogous to the reservoir associated with the master cylinder of the conventional hydraulic brake system. Within cylinder 423 is a piston 427. A spring 429 seated against the end of cylinder 423 and a shoulder 431 of the piston normally holds the piston to its right end limit. The piston has, as shown, radial passages 433 communicating with an axial passage 435 leading to the interior of the piston and cylinder. A valve 437 closes the axial passage under the influence of a spring 439 seated against the valve and also against a hollow ring 441 fixedly located in the piston. At the discharge end of the cylinder is an outlet 443 normally closed against discharge of liquid by a ball valve 445 pressed by a spring 447 having a suitable abutment. Coaxial with the discharge outlet 443 from the cylinder is a discharge outlet from the valve unit as at 449 to which is connected a hydraulic conduit 451. Conduit 451 connects to a power unit designated generally as 453. It comprises a cup-shaped cylinder 455 through the bottom of which slides a rod 457. The rod is jointed at 459 to arm 123. The conduit 451 communicates through an aperture in head 461 of cylinder 455 with the chamber of the latter to the right of piston 463, the latter secured to rod 457 and carrying packing 465. A spring 467 in abutment with the piston 463 and seated in a recess 467' of the cylinder 455 holds a boss 469 of the piston against the head 461 which therefore limits the movement of the piston to the right. The power unit 453 may be secured to a chassis bracket 471 by fastening means 473.

Also within the control unit 405 is a fitting 475 having a seat 477 for a ball valve 480 held by a spring 479 to prevent passage of liquid from space outwardly of valve 445 and into the reservoir chamber 425 through radial passages 481. A plunger 483 is reciprocable within a bored out passage in fitting 475. The plunger engages, by means of its reduced stem 485, the ball valve 480 and may be depressed to hold that valve off its seat and against the pressure of valve closing spring 479 as shown in Fig. 12. Depression of the plunger is effected by a bell crank 487 engaging the plunger and pivoted externally to the unit at 489. The bell crank is rocked counter-clockwise to depress the plunger by a link 491 pivoted thereto and to the pedal 67 beneath its pivot so that the release motion of the pedal under the influence of its conventional spring rocks the bell crank and opens valve 480. Depression of the pedal when applying the brake causes the bell crank to move from the plunger, whereupon spring 479 closes the valve 480. Within the power cylinder 455 to the left of the piston 463 is an air vent 493.

In this form of the invention the parts are in the positions shown when the vehicle is at rest or traveling at a uniform speed. If the pedal is depressed and wheel rotation retarded, the inertia of the chassis (and its supported body, of course) soon causes a clockwise rotation of rock shaft 411 and arm 413. Simultaneously with the depression of the pedal valve 480 has closed as explained. The arm 413 pushes piston 427 to the left. Built up pressure within the cylinder supplements spring 439 in holding valve 437 closed. The piston movement therefore overcomes spring 447 and opens valve 445, thus delivering fluid through pipe line 451 to the power unit 453. Movement of piston 463 and its rod 457 rocks the arm 123 and redistributes the fluid pressure as before described. When the pedal is released valve 480 opens and fluid under pressure in the power unit 453 and pipe line 451 is free to flow into the reservoir as the piston of the power unit is being returned by its spring 467. Also, the return movement of piston 427 influenced by its spring 429 creates a void in cylinder 423 which is filled from the reservoir by way of the valve 437 opening against the resistance of spring 439.

It is not necessary to use power servo mechanism of the vacuum and hydraulic booster type such as have been described and through which the inertia device is to function. There is shown in Figs. 14, 15, and 16 an embodiment where the fluid pressure itself developed by the application of the brakes may be used to effect the braking redistribution in accordance with load redistribution influenced by deceleration. In these figures numeral 501 is applied to a modification of casting 53 of Figs. 1-5. This casting is designed for carrying the same master cylinders as before and these are not illustrated. The cylinder 73 and redistributing piston of Fig. 5 are changed. Taking the place of cylinder 73 of Fig. 5 is a two diameter recess, numeral 503 being used to designate the cylinder of larger diameter and 505 the aligned and communicating cylinder of lesser diameter. Within large cylinder 503 reciprocates a piston 507 and a connected smaller diameter piston 509 reciprocates within cylinder 505, the pistons having packings 511 and 513 respectively. A spring 515 in abutment with a plug 517 at the end of the small cylinder pushes the double piston into contact at its large end with a stop 519 on a plug 521 at that end. At 523 is seen the end of a tubular passage into the end of the large cylinder. This corresponds with the passage marked 99 in Fig. 5 and communicates (as in the case of Figs. 1-5) with the master cylinder for the rear brakes. Similarly a passage marked 525 affords communication between the end of the small cylinder and the master cylinder for the front brakes. A passage 527 affords communication between the reservoir 529' for the master cylinders and the end of the large cylinder adjacent the junction of the two cylinders. This permits flow of fluid medium in either direction whereby no built up pressure or development of suction at the inner end of the large cylinder will interfere with the reciprocation of the combined pistons.

The casting 501 is formed with a recess 529 between the ends of the double piston as shown. This recess is closed by a cover 531 secured as at 533. The cover journals a rock shaft 535, leakage being avoided by a cap and packing assembly 537. Externally there is keyed to the shaft 535 the eye 539 on the stem end of a weight 541. The weight is held in its position of rest by a spring 543 and a stop 545. Pinned to the inner end of rock shaft 535 is an arm 547 provided at its end with a roller 549. The roller travels along the front wall 550 of a slot 560 cut into the face of piston 507. The path of movement of roller 549 is shown by dotted lines in Fig. 16. From this figure it will be seen that any fluid pressure acting against piston 507 and tending to move it to the right is ineffective because it acts substantially axially through the link 547 to rock shaft 535. On the other hand, if shaft 535 is rocked by the swinging of the inertia weight, the roller 549 tends to leave the face 550 and if there should be unbalanced fluid pressures on the ends of the composite piston the two pistons may be moved to the right against the action of spring 515 and thereby effect redistribution of the fluid pressure as before.

The operation of this form will be readily understood. When the vehicle is at rest or moving forward at a uniform rate of travel, the parts are as shown in Figs. 14, 15, and 16. If the pedal is depressed pressure is applied upon the hydraulic wheel brake units as usual. The fluid pressure of the rear wheel system is effective through passage 523 upon the large diameter end 507 of the composite piston. The fluid pressure of the front wheel system is effective through passage 525 upon the small diameter end 509 of the composite piston. Owing to the difference in area the combined piston tends to move to the right but the effective force differential is only potential because of the resistance to the axial push as explained above. However, as soon as sufficient deceleration occurs the weight 541 swings clockwise and the roller 549 moves from the slot face 550, whereupon the unbalanced fluid pressure shifts the combined pistons and redistributes the fluid pressures upon the brakes at the two ends of the vehicles as before explained, the extent of redistribution being measured by the extent of swinging of the weight and therefore in proportion to the rate of the deceleration. Obviously the limit is attained when the product of pressures and areas at the two ends are alike. Upon release of the pedal the springs 515 and 543 restore the parts to their initial positions.

Figure 18:
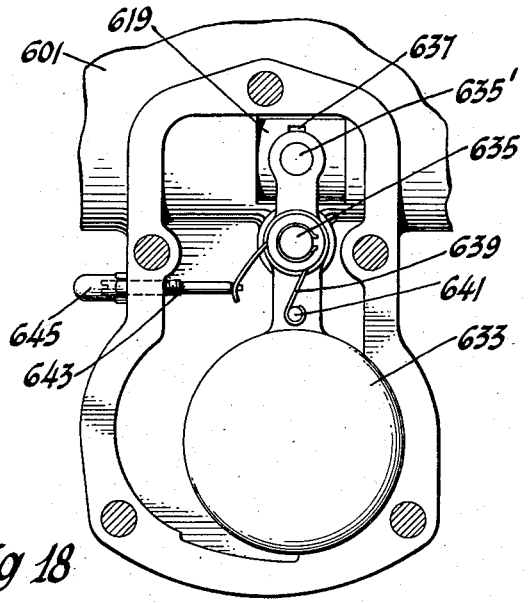
Fig. 18 is a side view of the same with the cover removed to illustrate the operating parts, the view being on line 18—18 of Fig. 17.
Figure 19:
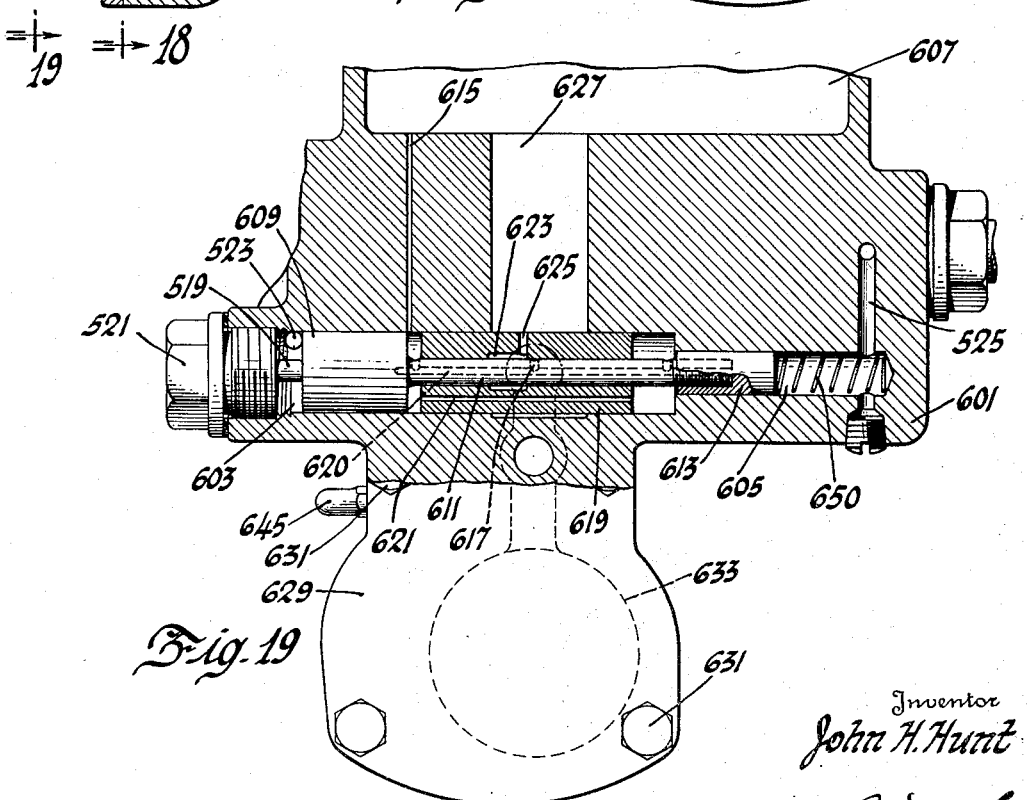
Fig. 19 is a section on line 19—19 of Fig. 17.

There is still another embodiment shown by Figs. 17, 18, and 19 in which a fluid pressure differential is employed. In these figures an inertia weight serves to control a valve, the position of which renders the potential energy against the large piston available to shift the combined piston assembly when the weight moves under the influence of inertia. In these figures 601 is used to designate the casting formed as before with the master cylinder, not shown, and with a two diameter cylinder, the parts of which are marked 603 and 605. In this form passages like 523 and 525 of Fig. 16 are used and are similarly marked. Plug 521 with its limiting stop 519 is also used in this form but the opposite end opening and plug 517 are omitted. The reservoir is marked by numeral 607. The large diameter piston 609 has an integral (or attached) reduced extension 611 threaded at its end into the smaller piston 613. The connecting extension 611 is axially bored at 620 and has radial passages adjacent the two pistons. A passage 615 affords communication between the reservoir 607 and the large diameter cylinder opening into the latter just at the right of the large piston when the latter contacts the stop 519. The extension 611 has another and intermediate radial passage 617 leading from the axial passages.

Slidable along extension 611 and fitting both the extension and the wall of the cylinder 603 is a valve 619. It has a through passage 621 to effect equalized pressure at its two ends. Between its ends it has an inner recess 623 from which extends a radial passage 625. The casting has a recess 627 extending downwardly from the reservoir to the midportion of the extension 611 and its slidable valve. Under a cover 629 secured by fastening means 631 over the recess there is a swinging weight 633 pivoted on a stud 635 threaded into the casting. Above the pivot the weight spindle carries a pin 635' projecting into a slot or notch 637 formed in the valve 619. A spring 639 wound around the pivot 635 is anchored at one end 641 to the stem of the weight 633. The other end is secured to an adjusting screw 643 which may be threaded into the casting to a variable extent to give the desired spring tension tending to hold the weight against the wall of the casting as shown. The adjusting screw may be covered by a cap 645. A light spring 650 functions to restore the combined piston to the position shown.

In this form of the invention the parts are in the positions shown when the vehicle is at rest or traveling forward at a uniform rate. If, now, the pedal is depressed and fluid pressure applied to the several wheel brake cylinders, equal pressures develop at the left end of large piston 609 through passage 523 communicating with the rear wheel master cylinder and at the right end of the small piston 613 because of passage 525 communicating with the master cylinder from the front wheel brakes. These equal pressures applied against unequal surfaces tend to shift the combined piston assembly to the right. Such shifting is possible for a slight movement, i. e. until the large piston covers passage 615. Further movement is checked because there is no outlet for the escape of fluid to permit a reduction in capacity of the chamber occupied by the large piston. Quickly, however, the inertia of the pivotally mounted weight causes it to shift to the left, Fig. 18. This slides the valve so that the recess 623 registers with radial passage 617, permitting the escape of fluid from large cylinder whereby the unbalanced pressure on the two pistons will effect the piston movement. This, as will be seen, tends to close the registration of 623 with 617 but the further swinging of the weight reopens the escape. The action will vary in extent in proportion to the extent of deceleration, or until the greater pressure in the small cylinder balances the smaller pressure in the larger cylinder. When the weight and valve return to their position of rest, the pressure head from the reservoir being more effective on the large piston than on the small piston, returns the combined piston to the position shown, this movement being aided by the spring 650.

I claim:

1. A system of hydraulic brakes for vehicles having front and rear brakes comprising hydraulic means for jointly applying said brakes in a predetermined ratio, movable means in fluid contact with and subject to the pressures of the hydraulic medium acting on said front and rear brakes and adapted to be moved in response to vehicle deceleration to modify said braking ratio.

2. A system of hydraulic brakes for vehicles having front and rear brakes comprising hydraulic means for jointly applying said brakes with pressures equal for both rear brakes and front brakes, movable means engaged by the fluid medium for operating said front brakes and also by the fluid medium for operating said rear brakes, and inertia responsive mechanism operatively connected to said movable means whereby said movable means may move and change the ratio of braking between the front brakes and rear brakes.

3. In brake mechanism for vehicles having front and rear brakes, means to apply said brakes with equal forces through the instrumentality of movable columns of a liquid medium, a conduit connecting said columns, a member movable in said conduit to change the ratio of forces applied by said columns, said movable member being movable in response to vehicle deceleration.

4. In a hydraulic brake system for vehicles having front and rear brakes, a plurality of master cylinders, a conduit system from a first one of said master cylinders for said front end brakes, a conduit from the second of said master cylinders for said rear end brakes, a redistributing cylinder, a reciprocable piston therein, conduits connecting the two master cylinders with the ends of said redistributing cylinder and means including an inertia member to shift said reciprocable piston whereby the front and rear brake pressures may vary in ratio under the influence of vehicle deceleration.

5. The invention defined by claim 4, said means including a power servo device acting in response to said inertia member to shift said reciprocable piston.

6. The invention defined by claim 4, said means including a vacuum servo device including a power unit and a valve, the latter controlled by said inertia member whereby the device acts in response to movements of the inertia member to shift said reciprocable piston.

7. In hydraulic brakes for vehicles having front and rear brakes, a plurality of liquid column brake applying means, one column operable for applying said brakes at one end of the vehicle, the other for applying said brakes at the other end of the vehicle, means acting through the instrumentality of said columns to apply said front brakes and said rear brakes in a predetermined ratio, inertia responsive means movable under the influence of deceleration, and fluid pressure means including a power cylinder and a valve therefor, the latter controlled by said inertia responsive means to activate said power cylinder to change the ratio of the forces applied to the front and rear brakes without supplementing the applied force acting through said columns whereby a greater force is operable upon said front brakes than upon said rear brakes to correspond with the change in ratio of front and rear loading.

8. In a hydraulic brake system for vehicles having a chassis frame and front and rear wheels, brakes for said wheels, fluid pressure means to apply the rear wheel brakes, fluid pressure means to apply the front wheel brakes, a conduit connecting said fluid pressure means, movable means in said conduit and inertia responsive means operatively connected to said movable means whereby the latter may be moved to supplement the pressure on the front brakes under the influence of deceleration.

9. In a hydraulic brake system for vehicles having a chassis frame and front and rear brakes, fluid pressure means to apply the rear brakes, fluid pressure means to apply the front brakes, a common operating means for both said fluid pressure means, conduit connecting said two fluid pressure means, movable means in said conduit, other means acting in response to deceleration of the vehicle incident to the application of said brakes, said other means being operatively connected to said movable means whereby the ratio of said front and rear braking may be changed.

10. In a hydraulic brake system for vehicles having a chassis frame and front and rear brakes, fluid pressure means to apply the rear brakes, fluid pressure means to apply the front brakes, a common operating means for both said fluid pressure means, and other means influenced by the inertia of said frame incident to the application of said brakes to supplement the fluid pressure on said front wheel brakes and reduce the fluid pressure on the rear wheel brakes, said other means including a master cylinder, a work cylinder, and a fluid column connecting said cylinders.

11. In a hydraulic brake system for vehicles having front and rear brakes, fluid pressure means to apply said rear brakes, fluid pressure means to apply said front brakes, unitary manually operated means jointly to apply said brakes through the instrumentality of said fluid pressure means, mechanism responsive to said fluid pressure and potentially operable to modify the ratio of braking pressures at the front and rear brakes and inertia responsive means to render said potentially operable mechanism active.

12. The invention defined by claim 11, said mechanism comprising coaxial cylinders having unequal diameters, connected pistons one in each cylinder, a conduit to transmit fluid to the front brake system from the smaller cylinder, and a conduit to transmit fluid to the larger cylinder from the rear brake system.

13. The invention defined by claim 11, said mechanism comprising coaxial cylinders having unequal diameters, connected pistons one in each cylinder, a conduit to transmit fluid to the front brake system from the smaller cylinder, a conduit to transmit fluid to the larger cylinder from the rear brake system, said inertia responsive means comprising a weight, means positioned by said weight to hold said pistons against movement under unbalanced fluid pressures, the movement of said weight under the influence of deceleration operable to release said holding means.

14. In a hydraulic brake system for vehicles having front and rear brakes, fluid pressure means to apply rear wheel brakes, fluid pressure means to apply front wheel brakes, a two diameter cylinder having its large and small bores connected to said rear and front brakes respectively, a piston in each cylinder, means in said large cylinder connecting said pistons and constructed to vent the space between the pistons, valve means to close said vent, and inertia responsive means to move said valve and open said vent.

15. A system of hydraulic brakes for vehicles having front and rear brakes comprising a master cylinder for the front wheel brakes, a master cylinder for the rear wheel brakes, piston means in each of said cylinders, common means for moving said pistons and fluid redistributing means having fluid conduit connection with both cylinders and inertia-responsive means to actuate said redistributing means whereby the ratio of braking at the front and rear of the vehicle is changed.

16. The invention defined by claim 15, said redistributing means comprising a cylinder, a piston therein, said inertia-responsive means being operably connected to said piston.

17. In brake mechanism for vehicles having liquid column means for applying front brakes and liquid column means for applying rear brakes, a conduit connecting said columns, a member movable in said conduit, said movable means adapted to move in response to vehicle deceleration whereby the ratio of front and rear brakes may be changed.

JOHN H. HUNT.